US007498075B2

(12) United States Patent
Bloomberg et al.

(10) Patent No.: US 7,498,075 B2
(45) **Date of Patent: *Mar. 3, 2009**

(54) USE OF PEARLESCENT AND OTHER PIGMENTS TO CREATE A SECURITY DOCUMENT

(76) Inventors: Bentley Bloomberg, 63 Parker St., Maynard, MA (US) 01754; Robert L. Jones, One Coventry La., Andover, MA (US) 01810

( * ) Notice: Subject to any disclaimer, the term of this patent is extended or adjusted under 35 U.S.C. 154(b) by 0 days.

This patent is subject to a terminal disclaimer.

(21) Appl. No.: 11/007,058

(22) Filed: Dec. 7, 2004

(65) Prior Publication Data

US 2005/0214514 A1 Sep. 29, 2005

Related U.S. Application Data

(63) Continuation of application No. 09/969,200, filed on Oct. 2, 2001, now Pat. No. 6,827,277.

(51) Int. Cl.
*B32B 3/00* (2006.01)
*G06K 19/06* (2006.01)

(52) U.S. Cl. ....................... 428/201; 428/203; 428/204; 428/206; 235/491; 235/468

(58) Field of Classification Search ....................... None
See application file for complete search history.

(56) References Cited

U.S. PATENT DOCUMENTS 3,949,501 A * 4/1976 Andrews et al. .............. 283/82
4,121,003 A 10/1978 Williams
4,155,618 A * 5/1979 Regnault et al. ............ 439/618
4,313,984 A 2/1982 Moraw et al.
4,415,225 A * 11/1983 Benton et al. ................. 359/31
4,428,997 A 1/1984 Shulman
4,663,518 A * 5/1987 Borror et al. ................ 235/487
4,765,656 A * 8/1988 Becker et al. ................. 283/70
4,773,677 A 9/1988 Plasse
5,005,873 A * 4/1991 West ........................... 283/92
5,066,947 A * 11/1991 Du Castel .............. 340/815.42
5,087,507 A * 2/1992 Heinzer ................... 428/195.1
5,169,707 A 12/1992 Faykish et al.
5,298,922 A 3/1994 Merkle et al.
5,304,789 A * 4/1994 Lob et al. ................... 235/487
5,380,695 A 1/1995 Chiang et al.
5,435,599 A 7/1995 Bernecker (Continued)

OTHER PUBLICATIONS

PCT Document, "Notification of Transmittal of the International Search Report or the Declaration and International Search Report," May 2, 2003.

(Continued)

*Primary Examiner*—Timothy M Speer
(74) *Attorney, Agent, or Firm*—Mintz, Levin, Ferris, Glovsky and Popeo PC

(57) ABSTRACT

A security material for documents comprises a first layer of material, such as a polymeric film or laminate, having first and second sides. A pearlescent material is applied to at least one of the first and second sides. The pearlescent material defines a pattern comprising at least two different colors that are at least partially interlocked in the pattern, and the pattern permits printed information that is overlaid by the pattern to be effectively perceived.

29 Claims, 2 Drawing Sheets

U.S. PATENT DOCUMENTS

| | | | | | |
|---|---|---|---|---|---|
| 5,458,713 | A | * | 10/1995 | Ojster | 156/234 |
| 5,573,584 | A | | 11/1996 | Ostertag et al. | |
| 5,629,093 | A | | 5/1997 | Bischof et al. | |
| 5,683,774 | A | | 11/1997 | Faykish et al. | |
| 5,688,738 | A | | 11/1997 | Lu | |
| 5,773,677 | A | * | 6/1998 | Lansink-Rotgerink et al. | 585/469 |
| 5,824,447 | A | * | 10/1998 | Tavernier et al. | 430/124 |
| 6,062,604 | A | | 5/2000 | Taylor et al. | |
| 6,082,778 | A | | 7/2000 | Solmsdorf | |
| 6,089,614 | A | | 7/2000 | Howland et al. | |
| 6,146,741 | A | * | 11/2000 | Ogawa et al. | 428/32.39 |
| 6,183,018 | B1 | * | 2/2001 | Braun et al. | 283/114 |
| 6,210,777 | B1 | | 4/2001 | Vermeulen et al. | |
| 6,284,337 | B1 | * | 9/2001 | Lorimor et al. | 428/40.1 |
| 6,444,377 | B1 | | 9/2002 | Jotcham et al. | |
| 6,474,695 | B1 | * | 11/2002 | Schneider et al. | 283/72 |
| 6,641,874 | B2 | | 11/2003 | Kuntz et al. | |
| 6,723,479 | B2 | | 4/2004 | Van De Witte et al. | |
| 7,081,282 | B2 | | 7/2006 | Kuntz et al. | |
| 2003/0226897 | A1 | | 12/2003 | Jones et al. | |

OTHER PUBLICATIONS

EP02797041.7 Search Report, Mar. 19, 2007, 3 pages.

EP02797041.7, Communication pursuant to Article 94(3) EPC, dated Dec. 28, 2007, of related EP counterpart application, 6 pages.

* cited by examiner

USE OF PEARLESCENT AND OTHER PIGMENTS TO CREATE A SECURITY DOCUMENT

RELATED APPLICATION DATA

This patent application is a continuation of U.S. patent application 09/969,200, filed Oct. 2, 2001 (Now U.S. Pat. No. 6,827,277), which is hereby incorporated by reference.

The present invention relates to security documents, e.g., credit cards, identification badges and the like and, more particularly, to the use of pearlescent and other materials, such as, ultra violet sensitive, or infrared sensitive elements with the pearlescent, in a predetermined design which can be read only under specified conditions and are extremely difficult to replicate, thereby creating a reliably secure instrument.

BACKGROUND

As the world moves relentlessly toward a cashless society, the venerable credit card has become a staple. So, too, in the corporate arena, where secret modes or methods are closely guarded and industrial espionage is seemingly on the rise, the ability to identify authorized personnel and distinguish them from interlopers has become an art form.

The foregoing examples are but two among a myriad of circumstances which call for the implementation of a system of secure identification by means of cards and badges. Drivers licenses, which are no longer simply evidence of payment of a fee, but have become a primary means of personal identification, are yet another category of use for secure instruments. The credit card issuers seem to be in competition to create the most decorative, yet secure instruments, and consumers seem to be attracted to issuers who provide more than just low introductory interest.

The security instrument industry seems to have taken on a life of its own and considerable research is being conducted into ways of producing an aesthetically pleasing identification card, or badge, which is incapable of being counterfeited and will destruct upon attempted alteration. The counterfeiting of identification documents involving as it does the alteration, fabrication, issuance and ultimately, use of such cards by persons not authorized to do so presents continual, and multiple security problems for legitimate issuers.

Perhaps the most effective, yet impractical, way to prevent counterfeiting would involve strict control over the possession of the materials and equipment involved in the fabrication of identification documents. For example, too many of the materials involved are commercially available and used in other, less sensitive, applications. To date, the more popular response to the counterfeiting problem involves the integration of several verification features to evidence authenticity. The best known of these "verification features" involve signatures such as the signature of the one authorized to issue the document, or the signature of the bearer. Other popular verification features have involved the use of watermarks, fluorescent materials, validation patterns or markings and polarizing stripes. These verification features and perhaps others, are integrated in various ways and may provide visual verification, or in some instances, invisible evidence of authenticity, in the finished card. If invisible, of course, authenticity is verifiable by viewing the instrument under conditions that render the invisible feature, visible.

The present invention is operative within this broad field, to teach a novel printing process using multiple colors to provide an interlocking design which is capable of producing an optically variable visual image, resulting in an instrument with enhanced security.

OVERVIEW OF THE PRIOR ART

From a meager beginning with a card having minimal identifying information imprinted on it, identification documents have progressed to ones which include a picture of the authorized person, such as, e.g., Andrews U.S. Pat. No. 3,949,501, wherein a photograph is laminated into a card having printed information accompanying the photograph. A later issued patent, U.S. Pat. No. 4,155,618, discloses the kind of sheet material that might be used in such a laminate. Magnetic coding may also be added to the card as taught in Andrews et al. U.S. Pat. No. 3,949,501. In Plasse U.S. Pat. No. 4,773,677, a layer of material is added to the laminate upon which an insignia is embossed.

Expanding on the concept of embossing an insignia into the identification card and as a means of making duplication and/or alteration more difficult, use of a hologram became an option. Mailloux et al. U.S. Pat. No. 5,066,947 is representative.

With the expanded use of lasers, Borror et al. capitalized on advances in the laser art to create a new level of security by developing a multi color card which is described in their U.S. Pat. No. 4,663,518.

In instances where security is a principal objective and counterfeiting of security documents provides a perceptible advantage to the counterfeiter and is, therefore, likely to occur, the use of holograms has become an effective means of thwarting counterfeiting efforts. Benton et al. U.S. Pat. No. 4,415,225 teaches at least one means of creating a holographic image. The hologram, by virtue of its capacity to convey varying visual imagery as the hologram is observed from various positions, makes the overall effect very difficult to replicate and, thus, rather ideal as an anti counterfeiting device. The process of creating holographic images is somewhat complex and requires equipment that is not readily available at one's office supply store. Research is ongoing, therefore, to find a way of creating a holographic effect without the necessity of forming a holographic image.

All of the verification features discussed above have achieved a measure of success in preventing or discouraging counterfeiting. Duplication of these feature(s), either singularly, or in combination, typically presents a sufficient obstacle of sufficient difficulty to discourage the average would-be-counterfeiter. However, to the ingenious and/or particularly motivated, at least some features are considered to be merely a challenge, thus creating a continuing need for more and better solutions. The present invention is addressed to that need.

SUMMARY OF THE INVENTION

One aspect of the invention is a security material comprising a layer of laminate having first and second sides. A plurality of materials is used for printing on at least a first side of the layer of laminate, and one of the materials comprises a pearlescent material. The materials are applied in a predetermined relationship at selected locations on the first side of the layer of laminate so as to define a pattern. The pattern comprises the pearlescent material and a design in which two differently colored materials are interlocked to define a visually active design that conveys a varying visual image depending on the attitude of the layer of laminate relative to the viewer and permits printed information that is overlaid by the pattern to be effectively perceived.

There are a number of possible variations to this security material. For example, at least one color of the colored materials may comprise a covert material that is invisible to the human eye, such as infrared, ultraviolet or combination of infrared and ultraviolet materials. Another example is using an adhesive or other structure to provide tamper evidence in the pattern in the event that the laminate is separated from a second material to which it is adhered. Another example is where the pattern comprises a gradient such that the pattern changes when viewed from differing angles.

Another aspect of the invention is a method of fabricating a security material. The method comprises providing a base layer, the base layer having first and second sides, and providing a plurality of materials for printing to at least the first side of the base layer, at least one of the plurality of materials comprising a pearlescent material. The method further comprises applying a pearlescent material at a first location on the first side of the base layer so as to define a pattern. The pattern comprises the pearlescent material and a design in which two differently colored materials are interlocked to define a visually active design conveying a varying visual image depending on the attitude of the security material relative to the viewer and permitting printed information that is overlaid by the pattern to be effectively perceived.

Yet another aspect of the invention is a security laminate comprising a first layer of polymeric material having first and second sides. A pearlescent material is applied to at least one of the first and second sides. The pearlescent material defines a pattern comprising at least two different colors that are at least partially interlocked in the pattern, and the pattern permits printed information that is overlaid by the pattern to be effectively perceived.

Yet another aspect of the invention is a security laminate comprising a base layer having first and second sides and means for defining an optically variable pattern on at least the first side of the base layer to provide an image having a holograph-like appearance but which does not require fabricating a hologram on the security instrument. The optically variable pattern is constructed and arranged so that, when the base layer is applied over printed information, the means for defining and optically variable pattern is capable of at least partially overlaying the printed information without effectively obscuring the overlaid printed information.

Further aspects of the invention are described in the following detailed description and accompanying drawings.

DETAILED DESCRIPTION OF A PREFERRED EMBODIMENT

Figure 1:
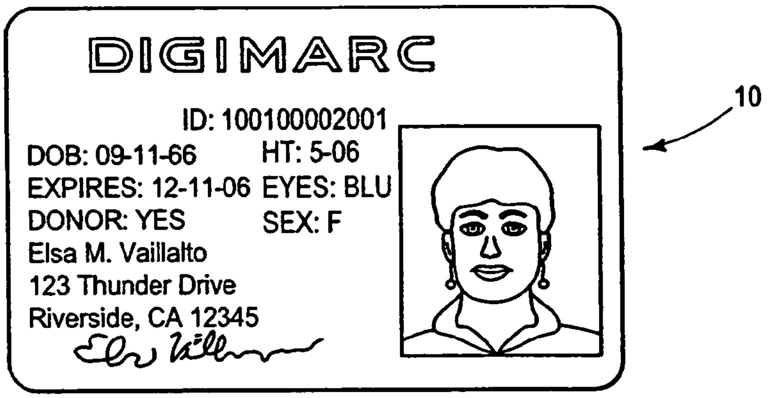
FIG. 1 is a pictorial representation of a security instrument, illustrating its overall appearance to the naked eye.
Figure 2:
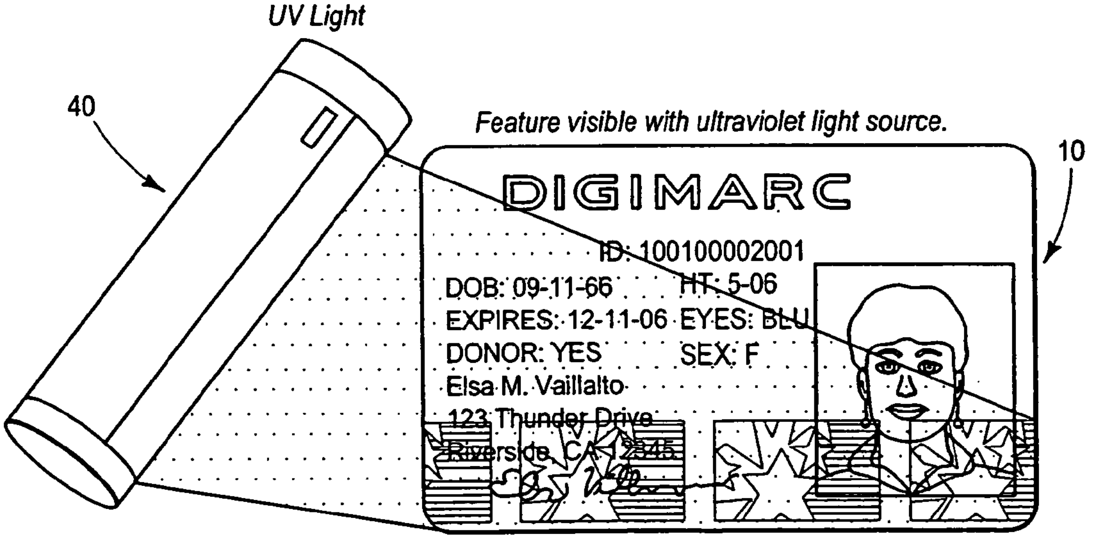
FIG. 2 is a view in the nature of FIG. 1, but illustrating how the security instrument would appear in the presence of ultraviolet light.

With reference now to the drawings, and initially to FIG. 1, a security instrument 10, constructed in accordance with the present invention, is there illustrated pictorially. The instrument, as illustrated, is in the nature of a printable card, although other instruments having the requisite characteristics are within the contemplation of the teachings to follow. The security instrument 10, in its exemplary form, has a rectangular shape and having both printed data, shown at 12, which might include a name, address, and perhaps a picture 14, along with identifying information which might be directly shown, or encoded, and might include, e.g., a social security number or in house identification number which is meaningful only to the card issuer. A data strip may also be provided, although not shown, without departure from the invention.

Various designs to be embodied in the instrument 10 are within the contemplation of the invention and might, for example, include the logo of the issuer, as well as any number of other designs which would be indigenous to the issuer or the issuer's business, or related characteristics. At least one such design, in keeping with the invention, is intended to substantially defy replication, or alteration, and is the product of a plurality of materials, including pearlescents, having been applied in a predetermined pattern, or relationship, to one of various laminates which are overlaid and bonded with one another to create the instrument 10.

In keeping with the invention, the pattern is integrated with a bond or seal existing between a protective cover sheet or film and the information-bearing surface of the card or document. The light-reflective materials contemplated by the present invention are preferably known products of commerce and include materials and/or pigments consisting of flat irregularly shaped mica platelets coated with titanium dioxide and/or iron oxide. The carrier may be colored with other compatible transparent materials and/or dyestuffs to produce a resultant color that will produce the desired effect and be compatible with the background. The textural quality of the pearl finish is adjustable through alteration of the particle sizes—fine particles produce a satin effect while large particles yield a glitter or sparkle effect. More precisely, light-reflective materials of the type described above which are particularly suitable for use in the present invention are those materials having an average particle size between 0 and 50 microns. For the purposes of this invention, "average particle size" means that the major portion of the material has a particle size between about 1 to about 25 microns although smaller portions of larger or smaller particles can be present.

Patterns comprising light-reflective materials of the above discussed characteristics are distinctive in that the pattern is visible or discernable at least on close examination of the finished document but the pattern does not effectively obscure document information covered by the pattern. Thus, when the laminates are bonded, or otherwise secured together, the user will be able to discern, looking upon the card, an iridescent design. Moreover, it is an added feature of this construction that as the instrument is tilted and rotated, the design appears to come to life, resulting in a variable and optically active appearance.

Figure 3:
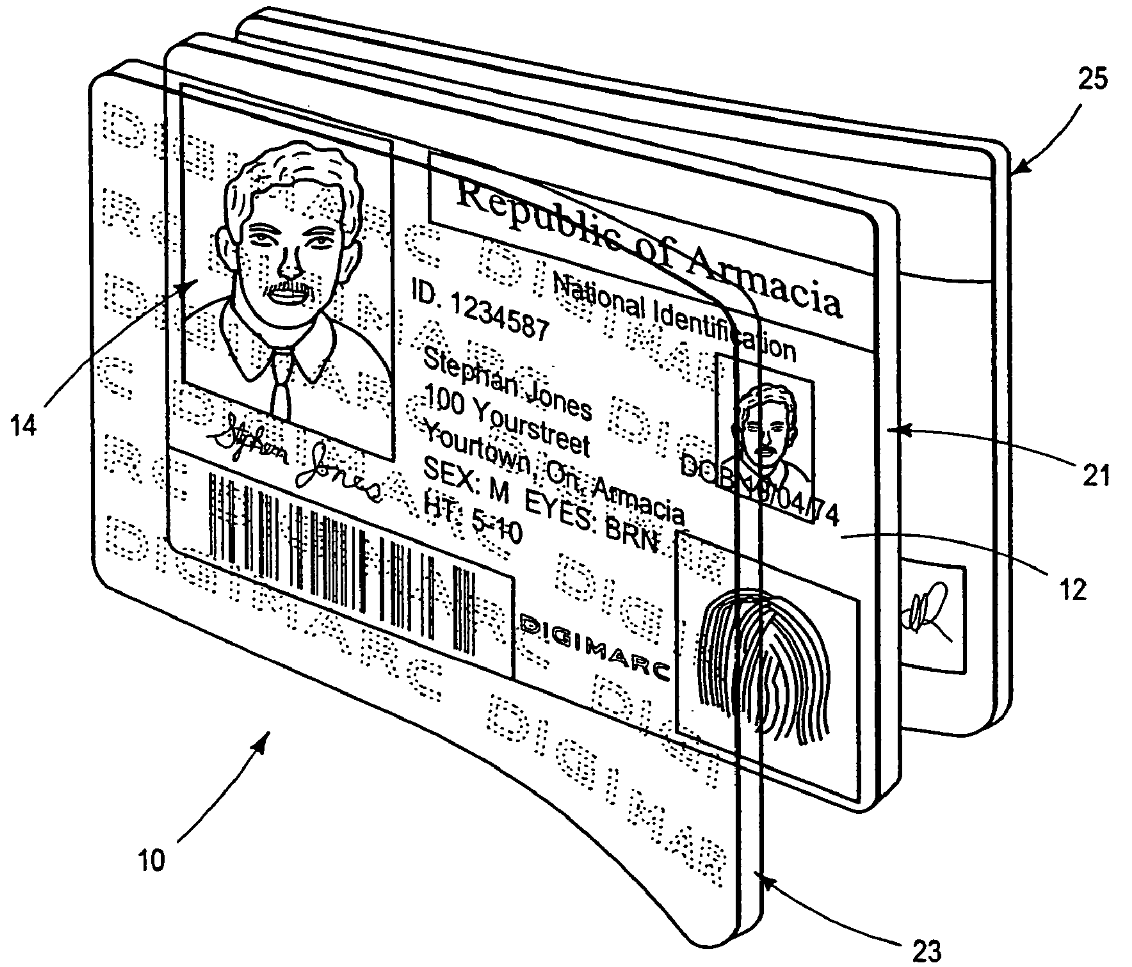
FIG. 3 is a perspective representation of a typical security instrument, illustrating a laminate structure and the application of materials to one or more layers of said laminate.

With special attention now to FIG. 3, a security instrument 10 constructed in accordance with the present invention comprises a base, or support substratum member 21. The base member is preferably of a plastic material, formed into a sheet and cut to size. The base member tends to be stiff, as distinguished from the laminates that are bonded to it, in order to provide some stability and durability to the instrument 10. Further, the substratum may be printed, or embossed, or otherwise impressed with printed data, which, by virtue of the transparency of the overlaying layers, is visible therethrough.

Construction of the security instrument 10 is completed by the addition, for example, of a series of laminates 23 and 25. More or less laminates may be employed without departure from the invention. The laminates are formed of a translucent, thin, flexible plastic film, of which Teslin® is particularly suitable, although other materials displaying the desired characteristics may be used without departure from the invention.

It has been determined that the integrity of the colors to be used are, in some measure, effected by the color or hue of the Teslin®, or other suitable material, it appearing that such materials demonstrate some variation in their color, while remaining essentially translucent. Thus, care must be taken in the selection of the material that demonstrates a background color that will compliment the materials and/or pigments to be used in forming the requisite pattern. While the process may be somewhat arduous, the result is that the materials to be printed thereon will demonstrate the optimum color saturation and provide the desired excellent optical variation when viewed in various attitudes.

The process employed to actually impress the material of the selected laminate may vary among methods familiar in the art, for printing these materials on a plastic surface, including use of a printer having engraved cylinders, and, perhaps, use of certain silk screen techniques.

Further in keeping with the invention, selected dyes, or pigments, are used to create an optically active design, which has an appearance which varies with the character and temperature of the light and/or the angle at which the instrument 10 is viewed.

To this end, pearlescent colors are selected, which may be primary colors; e.g., blue, red and green may be employed, among others. Once the design is chosen, the colors selected to make up the design are oriented for imprinting on the selected laminate to create the desired appearance at the surface of the instrument.

It will be appreciated that selection of the appropriate colors, materials and/or pigments may be important, and appropriate materials are known to be available from EM Industries under the trademark Afflair®, and from Mearl, under the trademark Duochrome®.

Thus, and in specific reference to the drawings, the laminate 23 may, for example, be printed with the selected pearlescent on one or more layers. The structure may be merely one layer, or may be comprised of multiple layers.

Once the laminate is imprinted, the instrument 10 is formed by the adherence, such as by bonding together of the laminates, such as by use of, for example, a D&K lamination device, thus completing the instrument. It is within the purview of the invention to create a comparable instrument through the use of non-visible materials, intermixed with materials within the visible spectrum, which are responsive to a light source having particular wave length, not normally visible with the naked eye.

For example, there are imprintable dyes, pigments or materials which as part of formulation, are responsive only to very short wave lengths in the ultra violet range and others which respond only to much longer wave lengths in the infrared range.

While such materials are essentially invisible to the human eye in normal lighting circumstances, and even though they may have a hue or tint inherent in them, by using a detection device 40, such as for example, a light source emitting a predetermined wave length, a pattern or design of a certain color is readily discerned. For example, an ultraviolet color may contain any of the primary colors or variations thereof.

Accordingly, an instrument is created which has particularly attractive security characteristics in that there is no overt evidence of a security message or design to the naked eye, but when presented in the appropriate environment, the secure nature of the instrument becomes evident and exceedingly difficult to tamper with or replicate.

Yet another alternative is available in the practice of the invention. Special materials are available and may be created by mixing pearlescents with material's having ultra violet or infrared properties. For example, a clear resin forming a base for the contemplated composite is, in keeping with this aspect of the invention, saturated with 0% to 50%, preferably 10%-30%, by weight, of pearlescent. To that admixture, a measured quantity of ultra violet or infrared material, for example, such as dye or pigment, having a selected hue or tint, is added, representing between 0% to 20% by weight, in a preferred embodiment between 2%-5%, of the composite.

The resultant composite can be formed by use of a variety of pearlescents to provide a particular pattern, or design, which would be visible to the naked eye.

The mixture that includes wavelength sensitive pigments or materials, visible only through the use of a detecting device, also presents the same appearance in the presence of such a detecting device. Clearly, the resultant instrument is particularly beneficial in enhanced security environments and very difficult to replicate; yet any effort to tamper with the instrument would be immediately obvious.

Finally, it is within the contemplation of the invention that both ultra violet and infrared materials, having a variety of colors, could be combined in the composite, further expanding the options to the issuer in terms of enhancing security and determining breaches thereof.

The integration of the previously described novel verification feature of the present invention with known adhesive systems provides a security instrument having special advantages. For example, under normal circumstances, it would be very difficult to remove a cover laminate from the printed laminate without disturbing the materials impressed thereon, thereby maintaining the interlocking pattern of light-reflective material undisturbed. Moreover, in the unlikely event that a cover laminate is removed with the pattern intact, at least some portions of the information-bearing surface of the print would expect to be adhered to the adhesive of the cover laminate. Any attempt to separate previously adhered laminates may expect to destroy or at least distort information-bearing surface, making such efforts immediately apparent.

In addition to protection from manual or mechanical intrusion, the printing process, using interlocking multi colored light reflective materials also provides protection against counterfeiting by photo copying. Protection against photo copying results from the failure of a copy to function. Protection from counterfeiting is provided by the requirement for special knowledge and special equipment and processes to duplicate the process. From the foregoing, it should be appreciated that the improved of the present invention provide a distinctive and effective verification feature that can be integrated with the documents in a relatively simple, inexpensive and convenient fashion. On the other hand, the instrument is sufficiently sophisticated to require specialized considerations and a concerted effort on the part of a would-be-counterfeiter to defeat or duplicate it.

It will now be appreciated that an embodiment of a security instrument is created by first forming a base member which defines the metes and bounds of the instrument and, after printing at least one layer of the instrument with pearlescent materials a design emerges at the surface of the completed instrument which is optically variable, i.e., the visual impression varies depending on the attitude of the card relative to the viewer and depending to some extent on the type and angle of the light in which it is viewed. Further, the design conveys a sense of depth to the viewer, giving dimension to the design, making it difficult, if not impossible, to replicate.

Having thus described a preferred embodiment of the present invention and certain variations on the main theme, it will be appreciated that certain modifications may be made without departure from that theme, and what is claimed, therefore, is:

1. A security material, comprising:

a layer of laminate, the laminate having first and second sides;

a plurality of materials being used for printing on at least a first side of the layer of laminate, wherein one of said plurality of materials comprises a pearlescent material;

the plurality of materials being applied in a predetermined relationship at selected locations on at the first side of the layer of laminate so as to define a pattern, wherein the pattern comprises the pearlescent material and a design in which two differently colored pearlescent materials are interlocked to define a visually active design that conveys a varying visual image depending on the attitude of the layer of laminate relative to the viewer and permits printed information that is overlaid by the pattern to be effectively perceived.

2. The security material of claim 1 wherein at least one color of the two differently colored materials comprises a covert material that is invisible to the human eye.

3. The security material of claim 2, wherein the covert material comprises an ultraviolet material.

4. The security material of claim 2, wherein the covert material comprises an infrared material.

5. The security material of claim 2, wherein the covert material comprises a combination of both ultraviolet and infrared materials.

6. The security instrument of claim 1, wherein the pattern has an appearance of depth which varies with the angle at which said security material is viewed.

7. The security material of claim 1 wherein the security material includes an adhesive layer along the first side, the adhesive layer being constructed and arranged such that, when the security material is adhered to a second material using the adhesive layer, if the security material is separated from the second material, the pattern adheres partially to the security material and partially to the second material.

8. The security instrument of claim 1, wherein the pattern comprises a gradient such that the pattern changes when viewed from differing angles.

9. A method of fabricating a security material, the method comprising:

providing a base layer, the base layer having first and second sides;

providing a plurality of materials for printing to at least the first side of the base layer, at least one of the plurality of materials comprising a pearlescent material;

applying a pearlescent material at a first location on the first side of the base layer so as to define a pattern, wherein the pattern comprises the pearlescent material and a design in which two differently colored materials are interlocked to define a visually active design conveying a varying visual image depending on the attitude of the security material relative to the viewer and permitting printed information that is overlaid by the pattern to be effectively perceived.

10. A security laminate, comprising:

a first layer of polymeric material, the first layer having first and second sides; and a pearlescent material applied to at least one of the first and second sides, the pearlescent material defining a pattern comprising at least two different pearlescent colors that are at least partially interlocked in the pattern, wherein the pattern permits printed information that is overlaid by the pattern to be effectively perceived.

11. The security laminate of claim 10 wherein the pearlescent material is applied to define a pattern having a varying appearance depending on the angle from which the security laminate is viewed.

12. The security laminate of claim 10 wherein the pearlescent material is applied to define a pattern having an appearance of depth.

13. The security laminate of claim 10 wherein the pearlescent material is applied to define a pattern that gives an appearance of movement when the security laminate is viewed as it is moved from a first angle to a second angle.

14. The security laminate of claim 10 wherein the pearlescent material is selected to define a pattern that has a varying appearance depending on the temperature of a light source that is illuminating the pattern.

15. The security laminate of claim 10 wherein at least a portion of the pattern is substantially visible to a human eye when the security laminate is viewed at a predetermined orientation.

16. The security laminate of claim 10 wherein at least a portion of the pattern is substantially invisible to a human eye when the security laminate is viewed at a predetermined orientation.

17. The security laminate of claim 16 wherein the portion of the pattern that is substantially invisible to a human eye is substantially visible to a human eye when the portion of the pattern is illuminated by a light having a predetermined wavelength in the spectrum of light wavelengths that are invisible to the human eye.

18. The security laminate of claim 17 wherein the predetermined wavelength comprises at least one wavelength in at least one of the infrared and ultraviolet ranges of light wavelengths.

19. The security laminate of claim 10, wherein the security laminate is constructed and arranged to be applied to a document such that the appearance of the pattern indicates whether the document is valid.

20. The security laminate of claim 19 wherein the appearance of the interlocking of the at least two colors indicates whether the security document is valid.

21. The security laminate of claim 10 wherein at least a portion of the pearlescent material comprises a substance that is substantially invisible to the human eye unless the portion of the pearlescent material is illuminated by a light having a predetermined wavelength in the spectrum of light wavelengths that are invisible to the human eye.

22. The security laminate of claim 10 wherein at least one of the two colors further comprises a material that is substantially invisible to the human eye unless the at least one color is illuminated by a light having a predetermined wavelength in the spectrum of light wavelengths that are invisible to the human eye.

23. The security laminate of claim 10 wherein at least one of the first and second sides of the laminate includes information formed thereon.

24. The security laminate of claim 10 wherein at least a portion of the pattern conveys information.

25. The security laminate of claim 10 wherein at least one of the two colors comprises a primary color.

26. The security laminate of claim 10 wherein the pearlescent material comprises at least three different interlocked colors.

27. The security laminate of claim 10 wherein the pearlescent material comprises 10–30% by weight of pearlescent pigment.

28. The security instrument of claim 10 wherein at least a portion of the pearlescent material comprises material responsive to light in at least one of the infrared and ultra violet light ranges.

29. A security laminate, comprising:

a base layer having first and second sides, and;

means for defining an optically variable pattern on at least the first side of the base layer to provide an image having a holograph-like appearance but which does not require fabricating a hologram on the security instrument and wherein the optically variable pattern is constructed and arranged so that, when the base layer is applied over printed information, the means for defining and optically variable pattern is capable of at least partially overlaying the printed information without effectively obscuring the overlaid printed information.

* * * * *